(12) United States Patent
Chang et al.

(10) Patent No.: US 10,591,776 B2
(45) Date of Patent: Mar. 17, 2020

(54) BACKLIGHT MODULE AND A DISPLAY DEVICE

(71) Applicant: Shenzhen China Star Optoelectronics Technology Co., Ltd., Shenzhen, Guangdong (CN)

(72) Inventors: Jianyu Chang, Guangdong (CN); Yung-jui Lee, Guangdong (CN); Yu-chun Hsiao, Guangdong (CN); Sheng-Jer Chang Chien, Guangdong (CN); Zanjia Su, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 325 days.

(21) Appl. No.: 15/558,185

(22) PCT Filed: Jul. 18, 2017

(86) PCT No.: PCT/CN2017/093258
§ 371 (c)(1),
(2) Date: Sep. 13, 2017

(87) PCT Pub. No.: WO2018/201619
PCT Pub. Date: Nov. 8, 2018

(65) Prior Publication Data
US 2019/0004374 A1   Jan. 3, 2019

(30) Foreign Application Priority Data

May 4, 2017   (CN) .......................... 2017 1 0308723

(51) Int. Cl.
*G02F 1/1335*  (2006.01)
*F21V 8/00*   (2006.01)
*B29D 11/00*  (2006.01)

(52) U.S. Cl.
CPC ....... *G02F 1/133617* (2013.01); *G02B 6/005* (2013.01); *G02B 6/0053* (2013.01);
(Continued)

(58) Field of Classification Search
CPC ......... G02F 1/133617; G02F 1/133606; G02B 6/005; G02B 6/0053; G02B 6/0055
(Continued)

(56) References Cited

U.S. PATENT DOCUMENTS 7,661,841 B2 *  2/2010  Kurihara ............... G02B 6/0023
                                                        313/113
2006/0221021 A1 * 10/2006  Hajjar .................. G03B 21/567
                                                         345/84

(Continued)

FOREIGN PATENT DOCUMENTS

CN     101226869 A    7/2008
CN     206848648 U    1/2018

OTHER PUBLICATIONS

U.S. Appl. No. 12/186,725, filed Dec. 20, 2011, Yu Ping Lin et al.

*Primary Examiner* — Bryon T Gyllstrom
(74) *Attorney, Agent, or Firm* — Andrew C. Cheng

(57) ABSTRACT

The present application discloses a backlight module and a display device, the backlight module including a light source for emitting at least a first light; at least two sheets of light conversion films, wherein at least one sheet of light conversion films receives the first light and converts the light into at least a second light to emit, and makes the light emitting angle of the backlight module matching the wide viewing angle display requirements. It can increase the light emitting angle of the backlight module and achieve the wide viewing angle effect. By having at least two sheets of light conversion films at the same time, a part of the light is reflected back while the light is scattered and emitted at the same time, and the light is excited and emitted again, to improve the light utilization rate, enhance the brightness to have a better performance of display.

20 Claims, 2 Drawing Sheets

(52) U.S. Cl.
CPC ..... *G02B 6/0055* (2013.01); *G02F 1/133606* (2013.01); *B29D 11/00634* (2013.01); *G02F 1/133615* (2013.01); *G02F 2001/133607* (2013.01); *G02F 2001/133614* (2013.01); *G02F 2202/36* (2013.01); *G02F 2203/09* (2013.01)

(58) Field of Classification Search
USPC .......................................................... 362/84
See application file for complete search history.

(56) References Cited

U.S. PATENT DOCUMENTS

| | | | | |
|---|---|---|---|---|
| 2012/0113672 | A1* | 5/2012 | Dubrow | G02B 6/0073 362/602 |
| 2014/0240644 | A1* | 8/2014 | Abe | G02B 6/0088 349/71 |
| 2015/0168634 | A1* | 6/2015 | Lu | G02B 6/0031 362/606 |
| 2015/0311385 | A1* | 10/2015 | Qiu | G02F 1/133606 257/13 |
| 2015/0369989 | A1* | 12/2015 | Hsu | G02B 6/0073 349/65 |
| 2015/0378077 | A1* | 12/2015 | Haag | G02B 5/3083 362/19 |
| 2015/0378089 | A1* | 12/2015 | Oba | G02B 6/005 349/70 |
| 2015/0378216 | A1* | 12/2015 | Oh | G02F 1/133609 349/69 |
| 2016/0177181 | A1 | 6/2016 | Liu et al. | |
| 2016/0223732 | A1* | 8/2016 | Jeon | G02F 1/133609 |
| 2017/0059129 | A1* | 3/2017 | Li | G02F 1/1336 |
| 2019/0004374 | A1* | 1/2019 | Chang | G02F 1/133617 |

\* cited by examiner

BACKLIGHT MODULE AND A DISPLAY DEVICE

FIELD OF THE INVENTION

The present application relates to a liquid crystal panel display technology, and more particularly to a backlight module and a display device.

BACKGROUND OF THE INVENTION

Liquid Crystal Display, LCD) has a thin, low power consumption, no radiation and other characteristics, it has now occupied the dominant position of the display field, the LCD display is widely used in high-definition digital television, desktop computers, tablet PCs, notebooks computers, mobile phones, digital cameras and other electronic equipment currently.

During the long-term research and development, the inventors of the present application have found that the light output from the backlight has a directivity after passing through the polarizer, the TFT, and etc., and in which most of the light is emitted vertically from the panel in the present technology; that is the image will have different colors when the LCD display is viewed from different sites, especially when the LCD display is viewed from a larger angle, the original color of the image cannot be seen, even only all white or all black can be seen, that is the problem of insufficient viewing angle. With the increasing size of the LCD, the probability of viewing the display from the side face is increasing, so it is necessary to develop a display device with wide viewing angle.

SUMMARY OF THE INVENTION

The technical problem that the present application mainly solves is to provide a backlight module and a display device which can make the display device have a larger viewing angle and achieve a better display effect.

In order to solve the above technical problems, a technical aspect of the present application is to provide a backlight module, the backlight module includes a light source for emitting at least a first light; at least two sheets of light conversion film, wherein at least one sheet of light conversion film receiving the first light and converting it into at least a second light to emit and makes the light emitting angle of the backlight module matching a wide viewing angle greater than 120 degrees; the color temperature is less than 16000 and the contrast is greater than 1500:1; the light conversion film including a light conversion material, and the concentration of the light conversion material in the light conversion film is 0.2% to 25% and the thickness of the light conversion material layer is 70 to 135 μm.

In order to solve the above technical problems, a technical aspect of the present application is to provide a backlight module, the backlight module includes a light source for emitting at least a first light; at least two sheets of light conversion films, wherein at least one sheet of light conversion film receiving the first light and converting it into at least a second light to emit and makes the light emitting angle of the backlight module matching a wide viewing angle requirement.

In order to solve the above technical problems, another aspect of the present application is to provide a display device, the display device including a backlight module, the backlight module includes a light source for emitting at least a first light; at least two sheets of light conversion films, wherein at least one sheet of light conversion film receiving the first light and converting it into at least a second light to emit and makes the light emitting angle of the backlight module matching a wide viewing angle requirement.

The advantages of the present application is, comparing to the conventional technology, the present application provides a backlight module, the backlight module includes at least two sheets of light conversion films, by the at least two sheets of light conversion films is capable of enhancing the scattering of light, increasing the light emitting angle of the backlight module, and the display device having the backlight module is brought to a wide viewing angle effect; with at least two sheets of light conversion films at the same time, and a part of the light is reflected at the same time as the light is scattered, the light is excited and emitted again to improve the light utilization rate, enhance the brightness of light to have a better performance of display.

BRIEF DESCRIPTION OF THE DRAWINGS

In order to more clearly illustrate the embodiments of the present application or prior art, the following FIGS. will be described in the embodiments are briefly introduced. It is obvious that the drawings are merely some embodiments of the present application, those of ordinary skill in this field can obtain other FIGS. according to these FIGS. without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts acquired should be considered within the scope of protection of the present application.

Specifically, the terminologies in the embodiments of the present application are merely for describing the purpose of the certain embodiment, but not to limit the invention.

Figure 1:
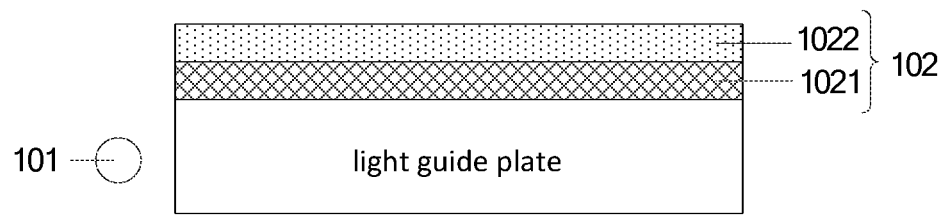
FIG. 1 is a schematic structural view of an embodiment of the backlight module of the present application.

Referring to FIG. 1, FIG. 1 is a schematic structural view of an embodiment of the backlight module of the present application. The present application provides a backlight module used for providing a backlight for a display device. The backlight module includes: a light source 101, at least two sheets of light conversion film 102. The light source 101 is a point light source, a linear light source or a surface light source capable of emitting at least a first light; the light source 101 can be a light emitting diode, LED lamp, the LED lamp can emit a plurality of colors of light, such as ultraviolet light or blue light. In other embodiments, the backlight light source can also be other light-emitting chips or the like.

Figure 2:
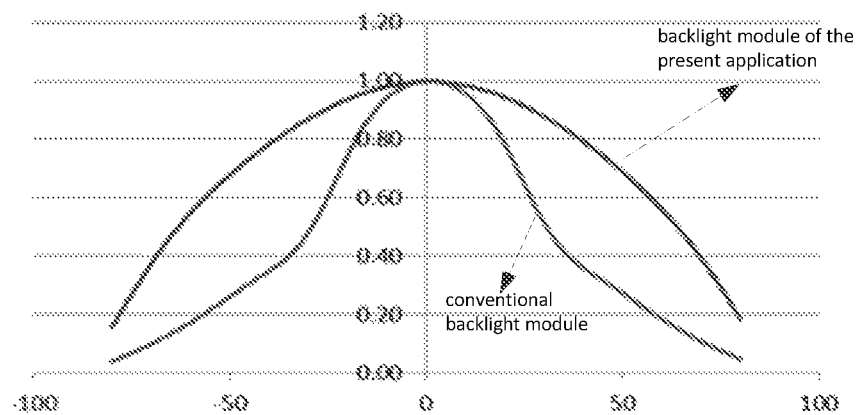
FIG. 2 is a comparison view of the brightness and viewing angle of the backlight module of the present application and the conventional backlight module.

Referring to FIG. 2, FIG. 2 is a comparison view of the brightness and viewing angle of the backlight module of the present application and the conventional backlight module. At least one sheet of light conversion film 1021 or 1022 receives the first light and converts it into at least a second light and emitting outside and makes the light emitting angle of the backlight module matches the wide viewing angle display requirement. After at least two sheets of light conversion film 102 to convert and scattering the first light, the light emitting angle of the backlight module matching the wide viewing angle will be greater than 120 degrees, for example, 120 degrees, 150 degrees, 170 degrees, etc. to meet the wide viewing angle display requirements, and thus can make the display device to achieve wide viewing angle effect.

Wherein the light conversion film 1021 or 1022 includes a light conversion material, the concentration of the light conversion material in the light conversion film 1021 or 1022 is 0.2% to 25%, wherein the concentration can be a mass content or a volume content, specifically, it can be adjusted according to the material, the density, the size of the particles of the material of the light conversion material, and the kind of the material of the base material, and the concentration in the other embodiments can also be the mass content or the volume content. As the concentration of the light conversion material increases, the color temperature of the backlight module will be decreased. Therefore, the concentration of the light conversion material can be appropriately increased in order to reduce the color temperature of the backlight module, for example, 0.2%, 1%, 6%, 13%, 25%, etc., so that the backlight temperature of the module is decreased to less than 16000, such as 14000, 11000, 9000, 7000 and so on.

Alternatively, in one embodiment, the backlight module provided in the present application not only has a large viewing angle and a low color temperature, but also its contrast is greater than 1500:1, for example, 1500:1, 3000:1, 5000:1 and the like.

Wherein, alternatively, the first light is an ultraviolet light or a blue light, the second light is a yellow light, or a mixed light of a green light and a red light, or a mixed light of a blue light, a green light and a red light, a third light is a red light.

Wherein the at least two sheets of light conversion films 102 convert the first light into a second light of the same or different wavelengths to be emitted, respectively.

Specifically, when the first light is a blue light, the light conversion film 102 receives the blue light and excite to emit a second light composed of a mixture of a green light and a red light of different wavelengths, or the light conversion film 102 receives the blue light and excite to emit a yellow light having the same wavelength as the second light; when the first light is a violet light, the light conversion film 102 receives the violet light and excite to emit to a second light composed of a mixture of a blue light, a green light and a red light of different wavelengths.

Alternatively, in one embodiment, one of the light conversion film 2021 or 2022 of the at least two sheets of light conversion film 202 converts the first light to the second light and emits, and the other light conversion film 2021 or 2022 converts the second light to a third light and emit. Specifically, when the first light is blue light, the light conversion film 2021 receives the blue light and excites to emit a second light composed of a mixture of green light and red light of different wavelengths, and the light conversion film 2022 receives the green light of the second light and excites to emit the red light with the same wavelength as the third light.

Figure 3:
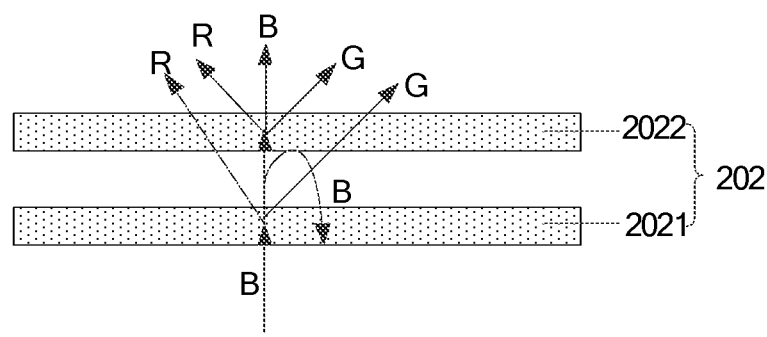
FIG. 3 is a schematic structural view showing directions of each light beam in an embodiment of the backlight module according to the present application.

Referring to FIG. 3, FIG. 3 is a schematic view showing the direction of each light in the embodiment of the backlight module according to the present application. In this embodiment, the two sheets of the light conversion film 202 are stacked, a portion of the first light passes through a sheet of light conversion film 2021 and is emitted to the other sheet of the light conversion film 2022, and is partially reflected back to continue the conversion of the first light to the second light. Through the stacked of the two light conversion films, when the light is scattered, at the same time, a portion of light can be reflected, and to perform the excitation and emitting light, to increase the light utilization rate, enhance the brightness of light, and have a better display effect. In another embodiment, the two sheets of the light conversion films can be arranged side by side, that is, the light passes through only one sheet of the light conversion film, by this kind of arrangement, the light does not need to pass through the multilayer optical film, has a larger light emitting angle, to reach a wider angle of view.

Taking blue light source as an example, partial of the blue light (B) passes through the light conversion film 2021 and absorbs by the light conversion material and is excited to generate red light (R) and green light (G); the generated red light and green light and partial of the blue light is mixed to produce white light by the light conversion film 2022 and used to provide the backlighting; another portion of the blue light passes through the light conversion film 2021 and is emitted to the light conversion film 2022, and is absorbed by the light conversion material in the light conversion film 2022 and is excited to generate red light (R) and green light (G), and a part of the blue light is reflected back and then absorbed and re-excited by the light conversion material in the light conversion film 2021 to increase the number of times of excitation and to improve the light utilization efficiency.

Alternatively, in one embodiment, the light conversion film 202 includes a light conversion material layer, the thickness of the light conversion material layer is 70 to 135 microns, for example: 75 microns, 95 microns, 115 microns, 135 microns, the thicker of the light conversion material layer will increase the consumption and loss of light, the thinner of the light conversion material layer will be reduced the light conversion rate. At the same time, the color temperature of the backlight module will be decreased by the increasing of the thickness of the film, so that in order to reduce the color temperature of the backlight module, the thickness of the light conversion material layer can be appropriately increased.

Alternatively, in one embodiment, the light conversion film 202 includes a quantum dot material and/or a fluorescent material. Wherein, the quantum dot, QD refers to the granular material with size in the order of nano scale in three-dimensional, the quantum dot can be in the excited state when exposing to light, and emit light with specific wavelength (such as specific color of light) from the excited state falling to the ground state, the emission spectrum of QD is mainly controlled by the particle size of QD. Therefore, the light emission spectrum can be adjusted by changing the particle size of QD. At the same time, the conversion efficiency of QD is high, which can improve the utilization rate of light, the half-wave width of the QD emission spectrum is very narrow, and with good color temperature stability. The material of the quantum dot can be II-VI quantum dot material, I-III-VI quantum dot material, and can be a mixture of different quantum dot material. Specifically, the quantum dot material can be one or more than one of $ZnCdSe_2$, CdSe, CdTe, $CuInS_2$, $ZnCuInS_3$.

The size of the quantum dot, the type of material, the type of fluorescent material can be selected according to the actual needs of the deployment.

Alternatively, in one embodiment, the ratio of the quantum dot material to the fluorescent material is from 1:100~1:5, for example, 1:100, 1:70, 1:40, 1:20, 1:5, the light conversion efficiency of the quantum dot material is higher than that of the ordinary fluorescent material, but the price of the quantum dot material is higher than that of the ordinary fluorescent material. If the whole piece of the light conversion film is selected as the quantum dot material, the fabrication cost is increased, and when the light conversion efficiency is constant, even if the amount of the quantum dot material is increased, the influence to the final display effect is not large, and the waste of resources is caused. Therefore, in this embodiment, the combination of the quantum dot material and the fluorescent material is used to ensure the light conversion efficiency and also cost savings.

Alternatively, in one embodiment, the quantum dot material has a particle size of 1~20 nm, for example: 1 nm, 5 nm, 8 nm, 15 nm, 20 nm, etc. The quantum dot material includes a blue light quantum dot material, a green light quantum dot material, and a red light quantum dot material, wherein, when the non-blue light source, such as an ultraviolet light source is used, the concentration of the blue quantum dot material in the quantum dot material is 40%~65%, such as 40%, 45%, 50%, 55%, 65%; the concentration of the green light quantum dot material in the quantum dot material is 15%~45%; for example: 15%, 25%, 35%, 40%, 45%; the concentration of the red light quantum dot material in the quantum dot material is 12% to 28%; for example: 12%, 15%, 18%, 22%, 28%, etc.; the ratio of the green light quantum dot material and the red light quantum dot material is 3:1~1.2:1; for example 3:1, 2.5:1, 2:1, 1.5:1 and so on. When using a blue light source, the blue quantum dot material can be not used, the green light quantum dot material and the red light quantum dot material can be adjusted according to the above distribution. Wherein, the particle size of the quantum dot material should be uniform distribution, to improve the purity of light. The blue quantum dot material is mainly used to absorb the first light and to convert it into the second light, for example, converting into green light and red light, so its content is larger; and the green light is easily to be absorbed into red light, so in order to make the final white light emitted to be more uniform, the content amount of the green light quantum point material should be more than the amount of the red light quantum material, so that the proportion of the three kinds of light in the final white light is about: blue light is 10%-30%, green light is 30%-70% and red light is 20%-40%.

Alternatively, in one embodiment, the backlight module can contain only two sheets of light conversion films 1021 and 1022 without the need for other prism films, diffusion films, brightness enhancement films, etc., the fabrication process is simple, making the display device thinner, cost savings, in other embodiments it can also include three, five and so on sheets of more light conversion films, to enhance light utilization rate, and it can also be used in conjunction with other films.

Alternatively, in one embodiment, the backlight module further includes a prism sheet disposed on the optical path of the at least two sheets of the light conversion films 102 away from the light source 101, for converging the light only at a perpendicular viewing angle; by depositing the prism sheet and the prism sheet converges light only at a perpendicular viewing angle, it can not only increase the viewing angle in the horizontal direction, but also improve the brightness of light, to achieve a better display performance.

Alternatively, in one embodiment, the backlight module further includes a brightness enhancement sheet disposed on the optical path of the at least two sheets of the light conversion films 102 away from the light source 101, for reflecting the other polarized light by a polarized light, the reflected the other polarized light is back to the second optical film 103 to continue the light conversion, so that further improving the degree of light conversion, thereby enhancing the brightness intensity and achieving a better display effect.

Alternatively, in one embodiment, the backlight module can include both a prism sheet and a brightness enhancement sheet, or only one of them can be included.

Of course, in one embodiment, no prism sheet is provided on the optical path of the light conversion film away from the light source 101, thereby avoiding the influence of the natural characteristics of the larger light emitting angle of the light conversion film itself; similarly, on prism sheet is provided on the optical path of the light conversion film adjacent the side of the light source 101, because the effect of prism sheet convergence light will also be affected by light conversion film.

Figure 4:
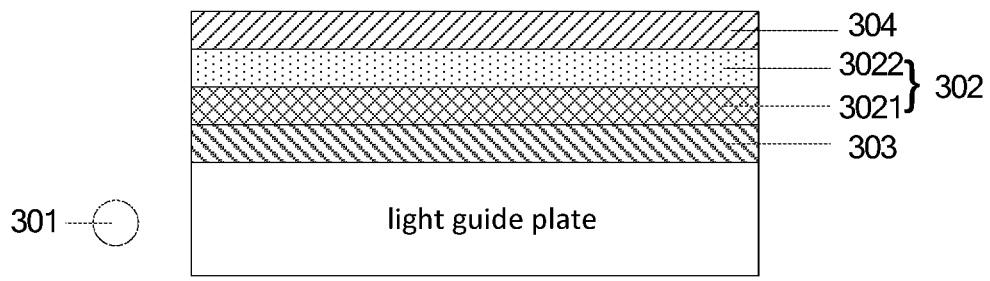
FIG. 4 is a schematic structural view of another embodiment of the backlight module of the present application.
Figure 5:
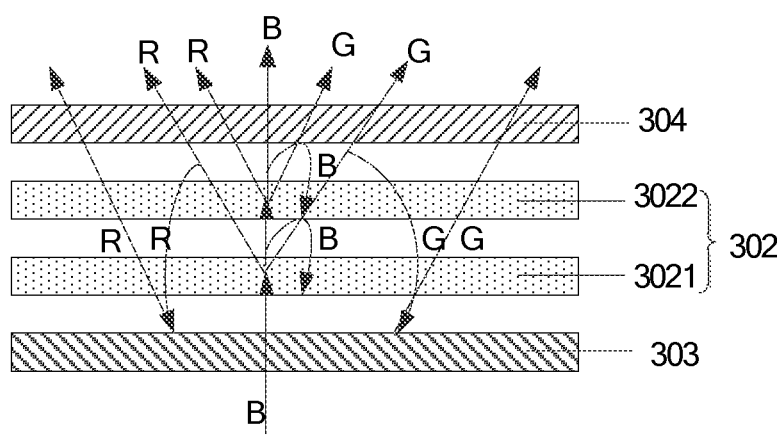
FIG. 5 is a schematic structural view showing directions of each light beam in another embodiment of the backlight module of the present application.

Referring to FIGS. 4-5. FIG. 4 is a schematic view of another embodiment of the backlight module according to the present application; and FIG. 5 is a schematic view showing the direction of each light in the backlight module according to another embodiment of the present application. In one embodiment, the backlight module further includes a first transflective film 303 disposed on the optical path of the at least two sheets of the light conversion films 302 adjacent to the light source 301, the first light is passing through and the light except the first light is reflected; and a second transflective film 304 disposed on the optical path of the at least two sheets of the light conversion films 302 away from the light source 301, at least partially reflecting the first light and passing through the light except the first light. By disposing the first transflective film, the first light can be selectively passed through, to increase the purity of the first light, and enhance the excitation efficiency; by disposing the second transflective film, it is possible to transmit light other than the first light, to form white light and provide as backlight source; and at the same time, it is able to partially reflect the first light, and can be excited to generate a second light again, to improve the utilization rate of the first light, and enhance the brightness of light. In another embodiment, it is also possible to provide a transflective film only in the side on the optical path of the at least two sheets of the light conversion films 302 away from the light source.

Taking blue light source as an example, the first transflective film 303 can transmit blue light (B) and reflect light other than blue light; blue light passes through the light conversion material, absorbs and is excited to generate red light (R) and green light (G); the generated red light and green light and partial of the blue light can pass the second transflective film 304 and are mixed to produce white light and used to provide the backlighting; the generated partial of the red light and green light cannot pass through the first transflective film 303 and is reflected back, re-emitted to improve the light utilization rate; the same time, partial of the blue light is reflected back, and is re-absorbed by the light conversion material, and is excited again, increase the number of excitation and improve the light utilization rate.

Alternatively, in another embodiment, the backlight module can also be a direct light type light source to provide a backlight source of the display apparatus.

Figure 6:
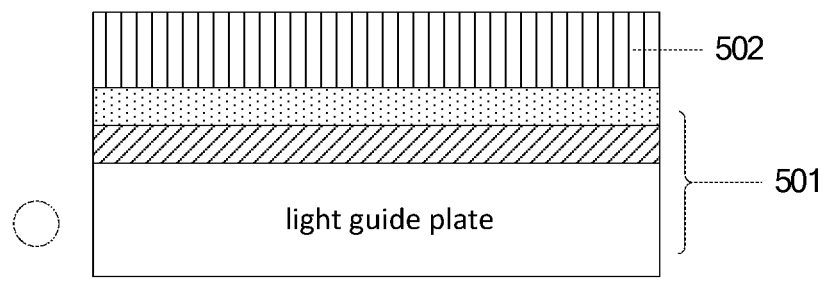
FIG. 6 is a schematic structural view of an embodiment of the display device according to the present application.

Referring to FIG. 6, FIG. 6 is a schematic structural view of an embodiment of the display apparatus of the present application. The present application provides a display apparatus including a backlight module 501 and a liquid crystal display panel 502, and the structure of the backlight module 501 is the same as that of the above embodiment and will not be described again. The structure of the liquid crystal display panel 502 is a conventional structure. The backlight module of the display apparatus has a larger light emitting angle, and makes the display apparatus has a larger viewing angle, and has a better display performance.

In summary, the present application provides a backlight module, the backlight module c includes at least two sheets of light conversion film, capable of increasing light scattering by the at least two sheets of light conversion film, increasing the light emitting angle of the backlight module, and achieving a wide viewing angle effect; with at least two sheets of light conversion film at the same time, during the scattering light while a partial of the light can be reflected back, and proceeding the light exciting again, to improve the light utilization rate, enhance brightness of light, have a better display performance.

Above are embodiments of the present application, which does not limit the scope of the present application. Any modifications, equivalent replacements or improvements within the spirit and principles of the embodiment described above should be covered by the protected scope of the invention.

What is claimed is:

1. A backlight module, comprising:
a light source for emitting at least a first light; and
at least two sheets of light conversion film stacked on one another, wherein at least one sheet of light conversion film receiving the first light and converting it into at least a second light to emit, and makes the light emitting angle of the backlight module greater than 120 degrees; the color temperature is less than 16000, the contrast is greater than 1500:1; the light conversion film comprising a light conversion material, and the concentration of the light conversion material in the light conversion film is 0.2%~25% the thickness of the light conversion material layer is 70 to 135 μm;
wherein the light conversion film comprises a quantum dot material and a fluorescent material, and a concentration ratio of the quantum dot material to the fluorescent material is 1:100~1:5.

2. The backlight module according to claim 1, wherein the at least two sheets of light conversion film convert the first light into a second light with the same or different wavelengths and to emit the light, respectively; or one sheet of the light conversion film converts the first light into a second light and emit it, and the other sheet of the light conversion film converts the second light to a third light and emit it.

3. The backlight module according to claim 2, wherein a portion of said first light passes through a sheet of the light conversion film and is emitted to another sheet of the light conversion film, and is partially reflected back to continue converting the first light to the second light and emit it.

4. The backlight module according to claim 1, further comprises:
a first transflective film disposed on the optical path of the at least two sheets of the light conversion film adjacent to the light source, the first light is passing through and the light except the first light is reflected; and
a second transflective film disposed on the optical path of the at least two sheets of the light conversion films away from the light source, the first light is at least partially reflected, and the light except the first light is passed through.

5. The backlight module according to claim 1, further comprises:
a prism sheet disposed on the optical path of the at least two sheets of the light conversion films away from the light source, for converging the light only at a perpendicular viewing angle; and/or
a brightness enhancement sheet disposed on the optical path of the at least
two sheets of the light conversion films away from the light source, for passing through a polarized light and reflecting the other polarized light.

6. The backlight module according to claim 1, wherein the light source is a non-blue light source; a particle size of the quantum dot material is 1~20 nm; the quantum dot material comprises a blue light quantum dot material, a green light quantum dot material, a red light quantum dot material, a concentration of the blue light quantum dot material in the quantum dot material is 40%-65%; a concentration of the green light quantum dot material in the quantum dot material is 15%-45%, and a concentration of the red light quantum dot material in the quantum dot material is 5%-30%; a concentration ratio of green light quantum dot material to the red light quantum dot material is 3:1~1.5:1.

7. A backlight module, comprising:
a light source for emitting at least a first light; and
at least two sheets of light conversion film stacked on one another, wherein at least one sheet of light conversion film receiving the first light and converting it into at least a second light to emit, and makes the light emitting angle of the backlight module matches the wide viewing angle display requirement;
wherein the light conversion film comprises a quantum dot material and a fluorescent material, and a concentration ratio of the quantum dot material to the fluorescent material is 1:100~1:5.

8. The backlight module according to claim 7, wherein the light emitting angle of the backlight module is greater than 120 degrees; the color temperature is less than 16000, the contrast is greater than 1500:1.

9. The backlight module according to claim 7, wherein the at least two sheets of light conversion film convert the first light into a second light with the same or different wavelengths and to emit the light, respectively; or one sheet of the light conversion film converts the first light into a second light and emit it, and the other sheet of the light conversion film converts the second light to a third light and emit it.

10. The backlight module according to claim 9, wherein a portion of said first light passes through a sheet of the light conversion film and is emitted to another sheet of the light conversion film, and is partially reflected back to continue converting the first light to the second light and emit it.

11. The backlight module according to claim 7, wherein the light conversion film comprising a light conversion material, and the concentration of the light conversion material in the light conversion film is 0.2%~25%.

12. The backlight module according to claim 7, wherein the thickness of the light conversion material layer is 70 to 135 m.

13. The backlight module according to claim 7, further comprises:

a first transflective film disposed on the optical path of the at least two sheets of the light conversion film adjacent to the light source, the first light is passing through and the light except the first light is reflected; and a second transflective film disposed on the optical path of the at least two sheets of the light conversion films away from the light source, the first light is at least partially reflected, and the light except the first light is passed through.

14. The backlight module according to claim 7, further comprises:

a prism sheet disposed on the optical path of the at least two sheets of the light conversion films away from the light source, for converging the light only at a perpendicular viewing angle; and/or a brightness enhancement sheet disposed on the optical path of the at least two sheets of the light conversion films away from the light source, for passing through a polarized light and reflecting the other polarized light.

15. A display apparatus comprises a backlight module, wherein the backlight module, comprising: a light source for emitting at least a first light; and at least two sheets of light conversion film stacked on one another, wherein at least one sheet of light conversion film receiving the first light and converting it into at least a second light to emit, and makes the light emitting angle of the backlight module matches the wide viewing angle display requirement;

wherein the light conversion film comprises a quantum dot material and a fluorescent material, and a concentration ratio of the quantum dot material to the fluorescent material is 1:100~1:5.

16. The display apparatus according to claim 15, wherein the light emitting angle of the backlight module is greater than 120 degrees; the color temperature is less than 16000, the contrast is greater than 1500:1.

17. The display apparatus according to claim 15, wherein the backlight module further comprises:

a first transflective film disposed on the optical path of the at least two sheets of the light conversion film adjacent to the light source, the first light is passing through and the light except the first light is reflected; and a second transflective film disposed on the optical path of the at least two sheets of the light conversion films away from the light source, the first light is at least partially reflected, and the light except the first light is passed through.

18. The display apparatus according to claim 15, wherein the backlight module further comprises:

a prism sheet disposed on the optical path of the at least two sheets of the light conversion films away from the light source, for converging the light only at a perpendicular viewing angle; and/or a brightness enhancement sheet disposed on the optical path of the at least two sheets of the light conversion films away from the light source, for passing through a polarized light and reflecting the other polarized light.

19. The display apparatus according to claim 15, wherein the light source is a non-blue light source; a particle size of the quantum dot material is 1~20 nm; the quantum dot material comprises a blue light quantum dot material, a green light quantum dot material, a red light quantum dot material, a concentration of the blue light quantum dot material in the quantum dot material is 40%-65%; a concentration of the green light quantum dot material in the quantum dot material is 15%-45%, and a concentration of the red light quantum dot material in the quantum dot material is 5%-30%; a concentration ratio of green light quantum dot material to the red light quantum dot material is 3:1~1.5:1.

20. The display apparatus according to claim 19, wherein white lights are emitted from the backlight module; the white lights comprise blue lights, green lights, and red lights; a ratio of the blue lights to the white lights is 10%-30%, a ratio of the green lights to the white lights is 30%-70%, and a ratio of the red lights to the white lights is 20%-40%.

\* \* \* \* \*